United States Patent
Mizutani et al.

(10) Patent No.: US 12,492,967 B2
(45) Date of Patent: Dec. 9, 2025

(54) GAS MEASURING DEVICE AND GAS MEASURING SYSTEM

(71) Applicants: SINTOKOGIO, LTD., Nagoya (JP); National University Corporation TOYOHASHI UNIVERSITY OF TECHNOLOGY, Toyohashi (JP)

(72) Inventors: Manase Mizutani, Nagoya (JP); Yoshihisa Suzuki, Nagoya (JP); Toshihiko Noda, Toyohashi (JP); Kazuaki Sawada, Toyohashi (JP)

(73) Assignees: SINTOKOGIO, LTD., Nagoya (JP); National University Corporation TOYOHASHI UNIVERSITY OF TECHNOLOGY, Toyohashi (JP)

( * ) Notice: Subject to any disclaimer, the term of this patent is extended or adjusted under 35 U.S.C. 154(b) by 96 days.

(21) Appl. No.: 18/129,302

(22) Filed: Mar. 31, 2023

(65) Prior Publication Data
US 2023/0314289 A1 Oct. 5, 2023

(30) Foreign Application Priority Data
Apr. 5, 2022 (JP) .................. 2022-063053

(51) Int. Cl.
*G01N 1/22* (2006.01)
*G01N 27/62* (2021.01)

(52) U.S. Cl.
CPC ......... *G01N 1/2214* (2013.01); *G01N 1/2205* (2013.01); *G01N 1/2247* (2013.01); *G01N 27/62* (2013.01); *G01N 2001/227* (2013.01)

(58) Field of Classification Search
CPC .. G01N 1/2214; G01N 1/2205; G01N 1/2247; G01N 27/62; G01N 2001/227;
(Continued)

(56) References Cited

U.S. PATENT DOCUMENTS

| | | | | |
|---|---|---|---|---|
| 6,147,351 A | * | 11/2000 | Huiku | G01N 21/0303 250/343 |
| 2009/0026362 A1 | * | 1/2009 | Arii | H01J 49/08 250/281 |

(Continued)

FOREIGN PATENT DOCUMENTS

| | | |
|---|---|---|
| CN | 101349665 A | 1/2009 |
| CN | 108760830 A | 11/2018 |

(Continued)

OTHER PUBLICATIONS

Wada Ryomei et al.: "Functional validation of an additional device to the gas sensor for arbitrary control sensing properties", Proceedings of IEEE Sensors, Dec. 17, 2021, pp. 1-4 (Year: 2021).*

(Continued)

*Primary Examiner* — Akm Zakaria
(74) *Attorney, Agent, or Firm* — Faegre Drinker Biddle & Reath LLP

(57) ABSTRACT

A gas measuring device includes: a gas rectification unit configured to rectify gas to control traveling directions and traveling speeds of gas molecules based on molecular weights of the gas molecules; and a gas sensor configured to absorb the gas molecules of the gas rectified by the gas rectification unit, and to detect absorption positions and absorption amounts.

8 Claims, 4 Drawing Sheets

(58) Field of Classification Search
CPC .... G01N 30/88; G01N 30/00; G01N 33/0011; G01N 33/0031; G01N 27/12
See application file for complete search history.

(56) References Cited

U.S. PATENT DOCUMENTS

| | | | |
|---|---|---|---|
| 2010/0018288 A1* | 1/2010 | Yamanaka | G01N 30/76 73/24.02 |
| 2011/0050242 A1* | 3/2011 | Koster | G03F 7/70916 324/464 |
| 2013/0026357 A1 | 1/2013 | Matthews et al. | |
| 2013/0209315 A1* | 8/2013 | Kimura | G01N 25/4826 422/88 |
| 2018/0052085 A1* | 2/2018 | Yoshikawa | G01N 9/002 |
| 2018/0292347 A1 | 10/2018 | Okino et al. | |
| 2020/0064291 A1* | 2/2020 | Varganov | G01N 27/227 |
| 2023/0078944 A1 | 3/2023 | Suzuki et al. | |

FOREIGN PATENT DOCUMENTS

| | | |
|---|---|---|
| CN | 113030194 A | 6/2021 |
| JP | H08-122107 A | 5/1996 |
| JP | 2004-205258 A | 7/2004 |
| JP | 2018-009814 A | 1/2018 |
| JP | 2021-096158 A | 6/2021 |
| JP | 2021-139765 A | 9/2021 |
| JP | 2021-534432 A | 12/2021 |
| WO | 2017/104130 A1 | 6/2017 |
| WO | 2020/041642 A1 | 2/2020 |

OTHER PUBLICATIONS

Wada Ryomei et al. : "Functional validation of an additional device to the gas sensor for arbitrary control sensing properties", Proceedings of IEEE Sensors, Dec. 17, 2021, pp. 1-4 (Year: 2021).*
Proceedings of IEEE sensors (Year: 2021).*
Extended European Search Report issued Aug. 10, 2023 in Application No. 23164951.8.
Bocos-Bintintan Victor et al., "Sensors' array of aspiration ion mobility spectrometer as a tool for bacteria discrimination," TALANTA, vol. 206, Aug. 6, 2019, pp. 1-8, XP085810614.
Wada Ryomei et al, "Functional validation of an additional device to the gas sensor for arbitrary control sensing properties," Proceedings of IEEE Sensors, Dec. 17, 2021, p. 1-p. 4, XP034052293.
Japanese Office Action issued Oct. 21, 2025, in Application No. 2022-063053.

* cited by examiner

GAS MEASURING DEVICE AND GAS MEASURING SYSTEM

CROSS-REFERENCE TO RELATED APPLICATION

This application is based on Japanese Patent Application No. 2022-063053 filed with Japan Patent Office on Apr. 5, 2022, the entire contents of which are hereby incorporated by reference.

TECHNICAL FIELD

The present disclosure relates to a gas measuring device and a gas measuring system.

BACKGROUND

Japanese Unexamined Patent Publication No. 2004-205258 discloses an odor measuring device. The odor measuring device includes two types of sensors different in sensitive characteristics to odors. A first sensor is a sensor for a heavy molecule detecting an odor molecule having a relatively large molecular weight, and a second sensor is a sensor for a light molecule detecting an odor molecule having a relatively small molecular weight. The odor measuring device measures an odor based on a vector. The vector is obtained by using a measurement value of a detection signal of the sensor for a heavy molecule as an element of an X-axis and a measurement value of a detection signal of the sensor for a light molecule as an element of a Y-axis. A magnitude of the vector indicates strength of the odor, and an inclination of the vector indicates quality of the odor.

SUMMARY

In the odor measuring device disclosed in Japanese Unexamined Patent Publication No. 2004-205258, it is necessary to prepare a sensor corresponding to a molecular weight of gas to be detected. Therefore, in a case where the gas to be detected contains a plurality of components, odor sensors corresponding to the respective components are necessary, which may complicate the configuration of the device. The present disclosure provides a gas measuring device and a gas measuring system that can measure components of gas with a simpler configuration.

A gas measuring device according to one aspect of the present disclosure includes: a gas rectification unit configured to rectify gas to control traveling directions and traveling speeds of gas molecules based on molecular weights of the gas molecules; and a gas sensor configured to absorb the gas molecules of the gas rectified by the gas rectification unit, and to detect absorption positions and absorption amounts.

In the gas measuring device, the traveling directions and the traveling speeds of the gas molecules are controlled by the gas rectification unit, based on the molecular weights of the gas molecules. The gas molecules controlled in the traveling directions and the traveling speeds reach different positions of the gas sensor based on the molecular weights, and are absorbed to the gas sensor. The absorption positions and the absorption amounts of the gas molecules are detected by the gas sensor. The absorption positions and the absorption amounts of the gas molecules depend on the molecular weights of the gas molecules. Therefore, the gas measuring device specifies the gas molecules based on, for example, the absorption positions and the absorption amounts. As described above, the gas measuring device can measure the components of the gas with a simpler configuration as compared with a gas measuring device including a plurality of odor sensors.

In one embodiment, the gas rectification unit may be a filter including a plurality of slits parallel to one another. In this case, the filter can rectify the gas when the gas passes through the slits.

In one embodiment, the filter may be made of silicon or aluminum. Silicon or aluminum does not show specific reaction to a specific gas molecule. Therefore, it is possible to avoid influence on rectification performance of the gas rectification unit.

In one embodiment, the gas sensor may include a sensitive film configured to absorb the gas molecules, and an output unit configured to output absorption positions and absorption amounts of the gas molecules absorbed to the sensitive film. In this case, for example, the gas measuring device can map the absorption positions and the absorption amounts of the gas molecules output from the output unit.

A gas measuring system according to another aspect of the present disclosure includes: a chamber configured to allow gas to flow therethrough; and a gas measuring device disposed inside the chamber and configured to measure the gas flowing inside the chamber. The gas measuring device includes a gas rectification unit configured to rectify the gas to control traveling directions and traveling speeds of gas molecules based on molecular weights of the gas molecules, and a gas sensor configured to absorb the gas molecules of the gas rectified by the gas rectification unit, and to detect absorption positions and absorption amounts. The gas measuring system can measure the components of the gas with a simpler configuration as compared with a gas measuring system including a plurality of odor sensors.

In one embodiment, the gas rectification unit may be a plate-like filter including, on a principal surface, a plurality of slits parallel to one another. The filter is disposed inside the chamber. In the filter, the principal surface is parallel to a flow direction of the gas, and an extending direction of each of the plurality of slits is orthogonal to the flow direction of the gas. In this case, the slits to which the gas molecules enter are different depending on the molecular weights. Therefore, the gas rectification unit can appropriately rectify the flowing gas based on the molecular weights.

In one embodiment, an ionization apparatus configured to ionize the gas molecules may be provided on an upstream of the chamber. In this case, the gas measuring system enables the gas sensor to easily detect the gas.

According to the gas measuring device and the gas measuring system of the present disclosure, it is possible to measure gas components with a simpler configuration.

DETAILED DESCRIPTION

Figure 1:
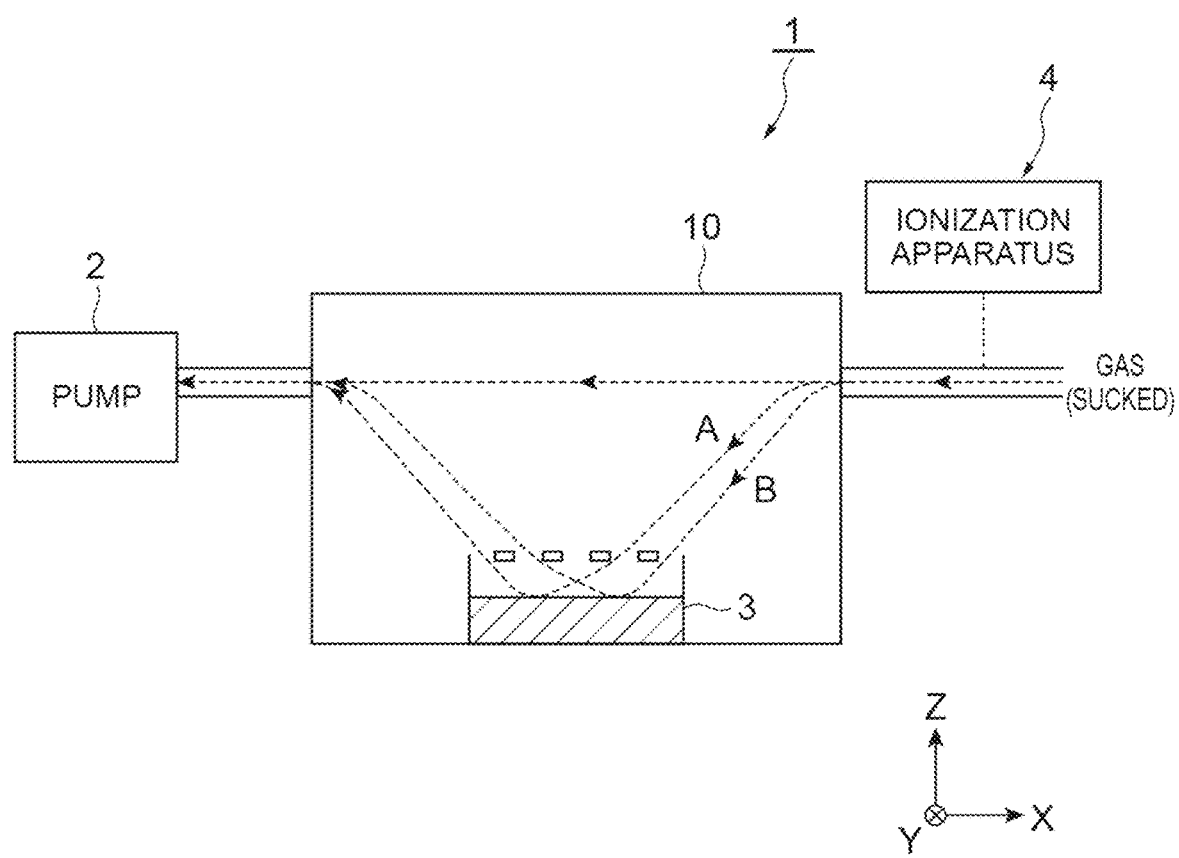
FIG. 1 is a schematic diagram illustrating an example of a gas measuring system according to an embodiment.

An embodiment of the present disclosure is described below with reference to drawings. In the following description, the same or equivalent elements are denoted by the same reference numerals, and redundant description is not repeated. Dimensional ratios of the drawings are not necessarily coincident with described dimensional ratios. Terms of "up", "down", "left", "right", "front", "rear", and the like are based on an illustrated state, are merely used for convenience, and do not limit the present disclosure.

[Configuration of Gas Measuring System]

FIG. 1 is a schematic diagram illustrating an example of a gas measuring system according to the embodiment. A gas measuring system 1 illustrated in FIG. 1 is a system measuring gas components. As illustrated in FIG. 1, the gas measuring system 1 includes a chamber and a gas measuring device 3. The chamber 10 internally defines a space where the gas measuring device 3 is housed, and gas can flow through the chamber 10. The chamber 10 includes a gas introduction port and a gas exhaust port. The gas measuring device 3 is a device measuring gas components, and is disposed inside the chamber 10. The gas exhaust port of the chamber 10 is provided with a pump 2 sucking gas in the chamber 10. The gas introduction port of the chamber 10 may be provided with an ionization apparatus 4. The ionization apparatus 4 ionizes gas molecules to be introduced into the chamber 10 by applying energy such as laser, light, and electrons into a gas pipe on an upstream of the chamber 10. This enables the gas measuring device 3 to easily detect the gas molecules.

[Configuration of Gas Measuring Device]

Figure 2:
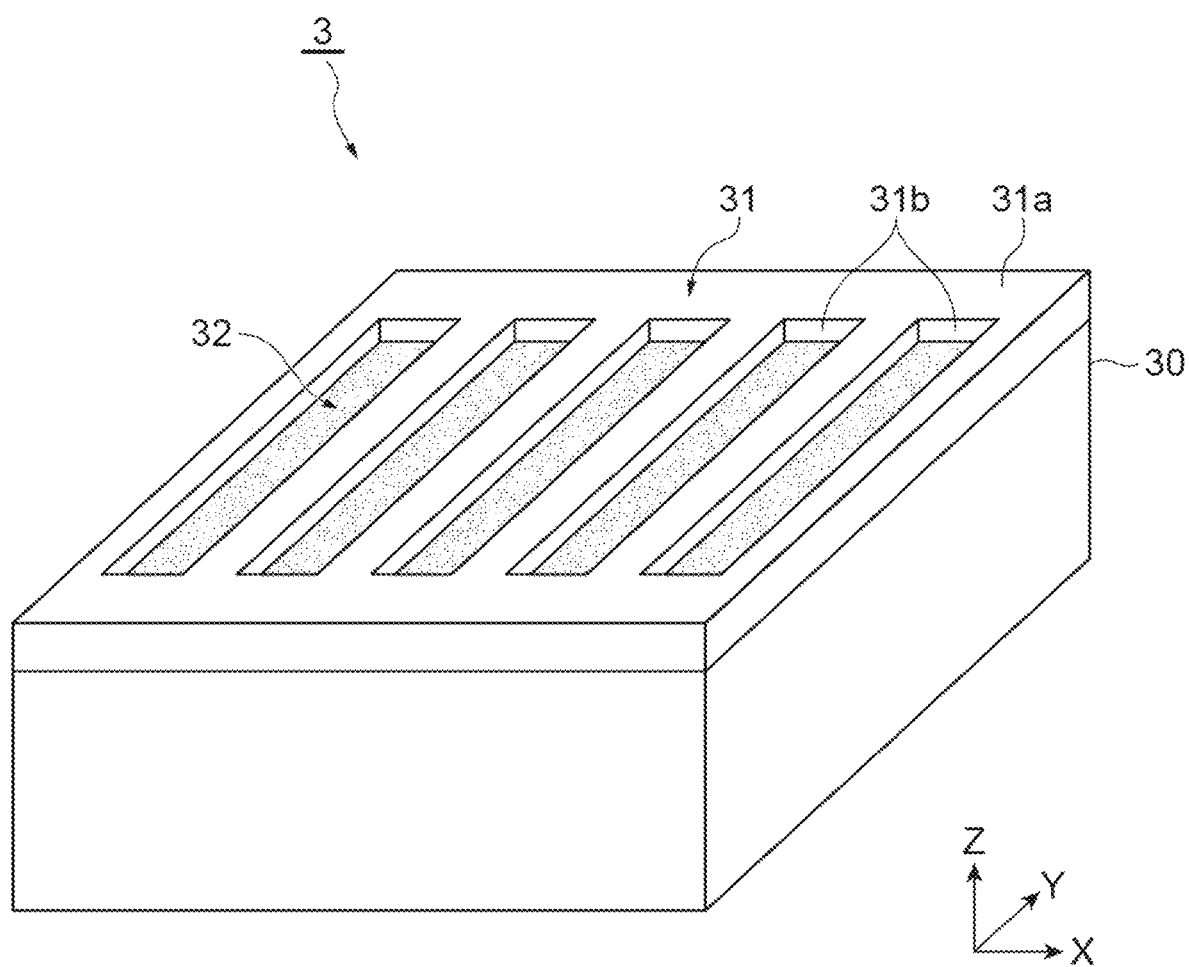
FIG. 2 is a perspective view of a gas measuring device used in the gas measuring system in FIG. 1.

FIG. 2 is a perspective view of the gas measuring device used in the gas measuring system in FIG. 1. The gas measuring device 3 includes a case 30, a filter 31 (an example of gas rectification unit), and a gas sensor 32. The case 30 is a box-shaped member having a released upper portion, and is made of a material not allowing the gas to pass therethrough. The case 30 internally defines a space where the gas sensor 32 is housed. The filter 31 is a substantially plate-like member, and is made of a material that does not show specific reaction to a specific gas component, such as silicon and aluminum. The filter 31 includes, on its principal surface 31a, a plurality of slits 31b parallel to one another. The filter 31 is disposed inside the chamber 10 such that the principal surface 31a is parallel to a flow direction of the gas and an extending direction of each of the plurality of slits 31b is orthogonal to the flow direction of the gas. An edge part of the filter 31 is air-tightly joined with an upper end of the case 30. The gas sensor 32 is provided on a bottom surface inside the case 30. The gas sensor 32 detects gas molecules having passed through the plurality of slits 31b of the filter 31.

[Configuration of Gas Sensor]

Figure 3:
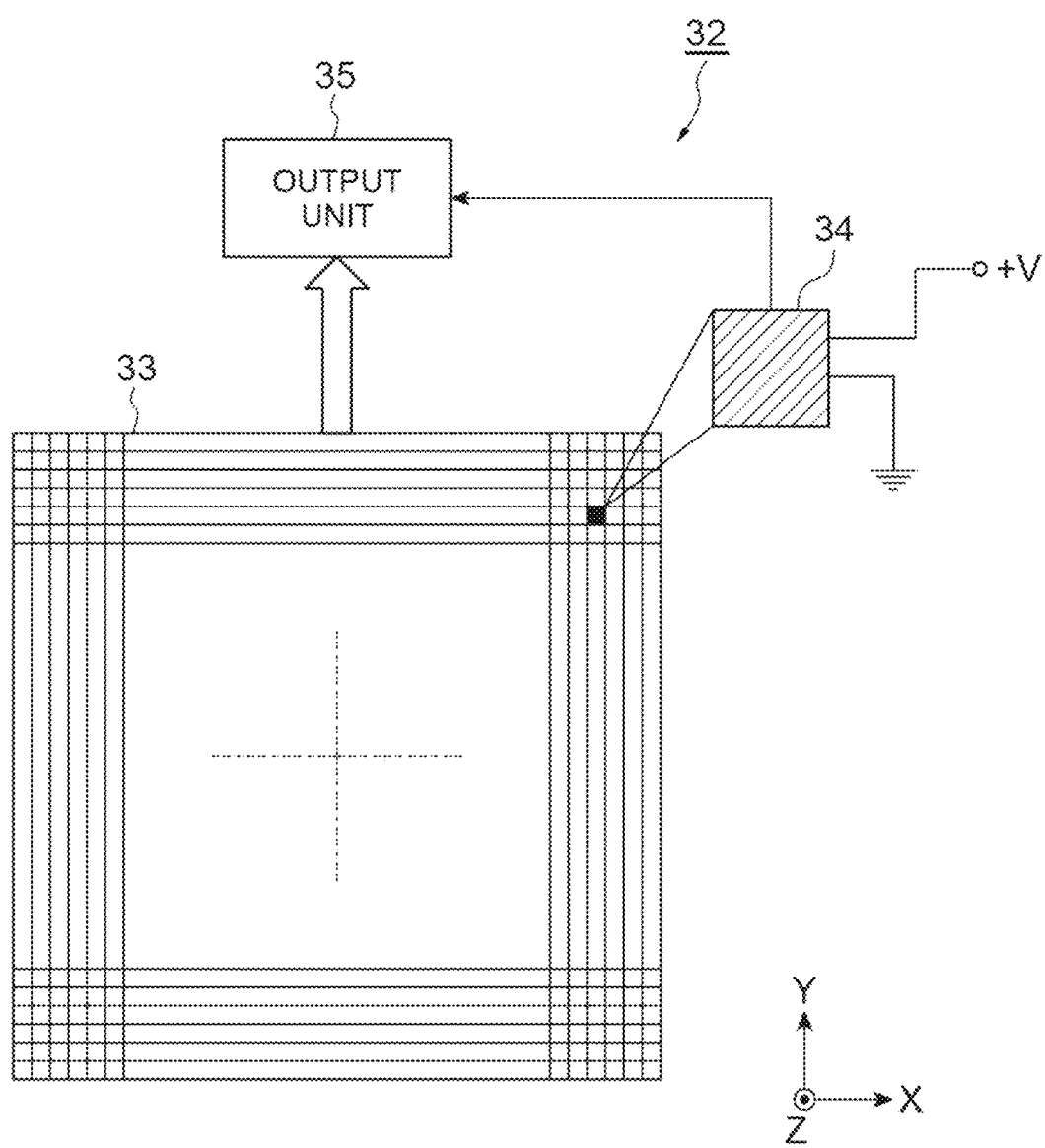
FIG. 3 is a plan view illustrating an example of a gas sensor in the gas measuring device in FIG. 2.

FIG. 3 is a plan view illustrating an example of the gas sensor in the gas measuring device in FIG. 2. As illustrated in FIG. 3, the gas sensor 32 includes a sensor circuit group including a plurality of sensor pixels 34, a sensitive film 33 provided on the sensor circuit group, and an output unit 35 connected to the sensor circuit group.

In the sensor circuit group, the plurality of sensor pixels 34 two-dimensionally arranged are provided on a semiconductor substrate. The sensor circuit group is a CMOS sensor as an example. The plurality of sensor pixels 34 are two-dimensionally arranged in M rows×N columns, thereby configuring a pixel array, where M and N are integers of two or more. A power supply voltage V is applied to each of the plurality of sensor pixels 34. A ground electrode of each of the plurality of sensor pixels 34 is grounded. Each of the plurality of sensor pixels 34 detects gas molecules absorbed to a corresponding area of the sensitive film 33.

The sensitive film 33 is disposed (film-formed) to stride over the plurality of sensor pixels 34 on the entire surface of the gas sensor 32. The sensitive film 33 is a thin film changed in state in response to absorption of the gas molecules. For example, electric characteristics such as impedance of the sensitive film 33 are changed based on chemical substances contained in the gas. The sensitive film 33 holds the absorbed gas molecules for a short time period, and then releases the absorbed gas molecules. Chemical constitutions or properties of the released gas molecules are not changed before and after absorption. The sensitive film 33 absorbs new gas molecules after releasing the gas molecules.

The output unit 35 is electrically connected to the sensor circuit group, and receives an electric signal from each of the plurality of sensor pixels 34. The electric signal represents that electric characteristics of an area of the sensitive film 33 corresponding to each sensor pixel 34 are changed. The output unit 35 calculates absorption positions and absorption amounts of the gas molecules absorbed to the sensitive film 33 based on the received electric signals, and outputs the absorption positions and the absorption amounts. The components of the gas are specified based on the absorption positions and the absorption amounts of the gas molecules output from the output unit 35, and previously-measured absorption positions and absorption amounts for each component of the gas.

[Rectification Principle of Gas Measuring System]

Figure 4:
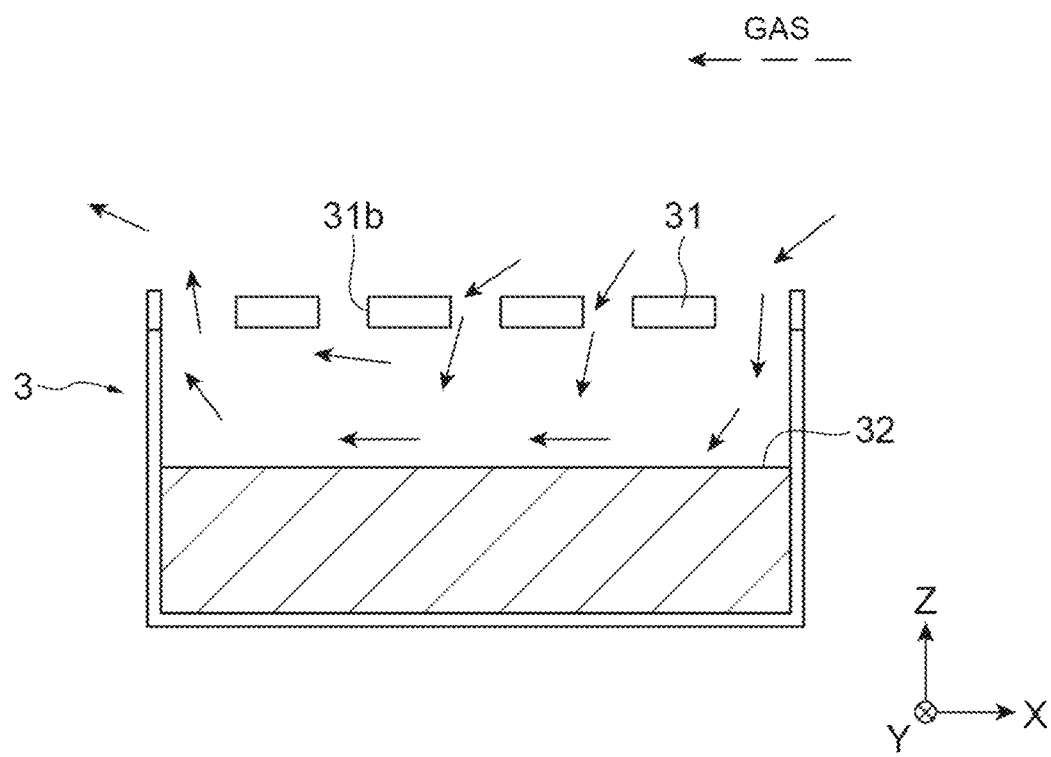
FIG. 4 is a schematic diagram to explain a rectification principle of the gas measuring system in FIG. 1.

FIG. 4 is a schematic diagram to explain a rectification principle of the gas measuring system in FIG. 1. As illustrated in FIG. 1 and FIG. 4, the gas molecules pass through the filter 31 of the gas measuring device 3, and are detected by the gas sensor 32. The gas molecules include a gas molecule A having a small molecular weight and a gas molecule B having a large molecular weight.

The gas molecules are introduced into the chamber 10 by being sucked by the pump 2. As the gas molecules having introduced into the chamber 10 advance by suction force of the pump 2, a part of them is moved down by the gravity. The gas molecule A and the gas molecule B pass through the filter 31 and reach the gas sensor 32. The gas molecule A and the gas molecule B are absorbed respectively to the sensitive film 33, held for a short time period, and then released. During a period from absorption to release, the gas sensor 32 detects the components of the gas. Thereafter, the released gas molecule A and the released gas molecule B are discharged from the chamber 10 through the gas exhaust port of the chamber 10 by the suction force of the pump 2.

Since the gas molecule A and the gas molecule B are different in molecular weight from each other, a route from introduction to exhaust of the gas molecule A and a route from introduction to exhaust of the gas molecule B are different from each other. The gas molecule B is greater in molecular weight than the gas molecule A. Therefore, after being introduced into the chamber 10, the gas molecule B flows downward faster than the gas molecule A. Accordingly, the gas molecule B tends to reach an area near the gas introduction port of the chamber 10 in the gas sensor 32 as compared with the gas molecule A. In contrast, the gas molecule A is less in molecular weight than the gas molecule B. After being introduced into the chamber 10, the gas molecule A flows downward over time as compared with the gas molecule B. Accordingly, the gas molecule A tends to reach an area near the gas exhaust port of the chamber 10 in the gas sensor 32 as compared with the gas molecule B.

The filter 31 includes the plurality of slits 31b parallel to one another. In a case where the gas molecule A and the gas molecule B flow downward, the gas molecule B having the large molecular weight reaches the gas sensor 32 through the slits near the gas introduction port of the chamber 10 among the plurality of slits 31b. The gas molecule A having the small molecular weight reaches the gas sensor 32 through the slits separated from the gas introduction port of the chamber 10 as compared with the gas molecule B. A direction and a speed of the flow of the gas are adjusted by the gas passing through the slits. Further, each of the gas molecules passes through the slit at the position corresponding to the molecular weight. As a result, flows of gas molecules based on the molecular weights are formed, and those flows are hardly mixed. As described above, presence of the filter 31 causes each of the gas molecules to be absorbed to the position corresponding to the molecular weight in the sensitive film 33.

Summary of Embodiment

In the gas measuring device 3 of the gas measuring system 1, traveling directions and traveling speeds of the gas molecules are controlled by the filter 31 based on the molecular weights of the gas molecules. The gas molecules controlled in the traveling directions and the traveling speeds reach different positions of the gas sensor 32 based on the molecular weights, and are absorbed to the gas sensor 32. The absorption positions and the absorption amounts of the gas molecules are detected by the gas sensor 32. The absorption positions and the absorption amounts of the gas molecules depend on the molecular weights of the gas molecules. Therefore, the gas measuring device 3 specifies the gas molecules based on the absorption positions and the absorption amounts. As described above, the gas measuring device 3 can measure the components of the gas with a simpler configuration as compared with a gas measuring device including a plurality of odor sensors.

Since the filter 31 includes the plurality of slits parallel to one another, the filter 31 can rectify the gas when the gas passes through the slits. The filter 31 is made of silicon or aluminum that is an inexpensive material easily obtainable and processable. Further, silicon or aluminum does not show specific reaction to a specific gas component. Therefore, it is possible to avoid influence on rectification performance of the gas rectification unit.

The gas sensor 32 includes the sensitive film 33 absorbing the gas molecules, and the output unit 35 outputting the absorption positions and the absorption amounts of the gas molecules absorbed to the sensitive film 33. Therefore, the gas measuring device 3 can map the absorption positions and the absorption amounts of the gas molecules output from the output unit 35.

[Modification]

Although various exemplary embodiments are described above, various omission, replacement, and change may be made without being limited to the above-described exemplary embodiments.

As illustrated in FIG. 4, in the filter 31, each of members forming the plurality of slits 31b has a strip-like cross-sectional shape; however, the cross-sectional shape of each of the members is not limited thereto. The cross-sectional shape of each of the members may be a parallelogram or a triangle, and can be appropriately changed.

In a case where the gas to be measured contains a predetermined gas molecule, a material having affinity to the predetermined gas molecule may be adopted for the filter 31 in order to specifically change an orbit of the predetermined gas molecule. Further, to specifically change the orbit of the predetermined gas molecule, widths of the slits 31b or intervals between adjacent two of the slits 31b may be made equal, or changed to optional sizes.

The number of sensitive films 33 provided on the upper surface of the gas sensor 32 may not be one. The upper surface of the gas sensor 32 is divided into a plurality of sections and a plurality of sensitive films 33 may be provided. Alternatively, a plurality of types of sensitive films different in sensitivity to each gas component may be provided. Further, arrangement of the plurality of types of sensitive films different in sensitivity to each gas component may be changed along the flow direction of the gas, based on the rectification effect of the filter 31. The sensitive film 33 may not cover a part of the sensor pixels 34. Further, introduction of the gas into the chamber 10 may be realized by providing a pump that forcibly feeds the gas into the chamber 10.

What is claimed is:

1. A gas measuring device comprising:
a plate-like filter including a principal surface on which a plurality of slits parallel to one another are formed, the principal surface being parallel to a flow direction of gas, and an extending direction of each of the plurality of slits being orthogonal to the flow direction of the gas, and configured to control traveling directions and traveling speeds of gas molecules based on molecular weights of the gas molecules by causing the gas molecules to pass, based on gravity, through slits corresponding to their respective molecular weights; and
a gas sensor configured to absorb the gas molecules of the gas, which have been rectified by the filter so that the gas molecules have reached different positions based on the molecular weights of the gas molecules, and to detect absorption positions and absorption amounts of the gas molecules,
wherein components of the gas are specified based on the absorption positions and the absorption amounts of the gas molecules.

2. The gas measuring device according to claim 1, wherein the filter is made of silicon or aluminum.

3. The gas measuring device according to claim 1, wherein the gas sensor includes a sensitive film configured to absorb the gas molecules, and an output unit configured to output the absorption positions and the absorption amounts of the gas molecules absorbed by the sensitive film.

4. The gas measuring device according to claim 2, wherein the gas sensor includes a sensitive film configured to absorb the gas molecules, and an output unit configured to output the absorption positions and the absorption amounts of the gas molecules absorbed by the sensitive film.

5. A gas measuring system comprising:
a chamber configured to allow gas to flow therethrough; and
a gas measuring device disposed inside the chamber and configured to measure the gas flowing inside the chamber,
wherein the gas measuring device includes a plate-like filter including a principal surface on which a plurality of slits parallel to one another are formed, the principal surface being parallel to a flow direction of the gas, and an extending direction of each of the plurality of slits being orthogonal to the flow direction of the gas, and configured to control traveling directions and traveling speeds of gas molecules based on molecular weights of the gas molecules by causing the gas molecules to pass, based on gravity, through slits corresponding to their respective molecular weights, and a gas sensor configured to absorb the gas molecules of the gas, which have been rectified by the filter so that the gas molecules have reached different positions based on the molecular weights of the gas molecules, and to detect absorption positions and absorption amounts of the gas molecules, and wherein components of the gas are specified based on the absorption positions and the absorption amounts of the gas molecules.

6. The gas measuring system according to claim 5, wherein an ionization apparatus configured to ionize the gas molecules is provided on an upstream of the chamber.

7. The gas measuring device according to claim 1, wherein the gas rectification unit is configured to rectify gas to be measured containing a predetermined gas molecule, and is made of a material having affinity to the predetermined gas molecule.

8. The gas measuring system according to claim 5, wherein the gas rectification unit is configured to rectify gas to be measured containing a predetermined gas molecule, and is made of a material having affinity to the predetermined gas molecule.

\* \* \* \* \*